United States Patent [19]

Mosimann et al.

[11] 4,087,712

[45] May 2, 1978

[54] METHOD OF PRODUCING WINDINGS FOR ELECTRICAL MACHINES AND APPLIANCES

[75] Inventors: Hans Mosimann; Werner Marti, both of Breitenbach, Switzerland

[73] Assignee: Schweizerische Isola-Werke, Breitenbach, Switzerland

[21] Appl. No.: 697,533

[22] Filed: Jun. 18, 1976

[30] Foreign Application Priority Data

Jun. 19, 1975 Switzerland .................... 8010/75

[51] Int. Cl.$^2$ .............................................. H02K 3/36
[52] U.S. Cl. ...................... 310/215; 310/45; 29/605; 29/606; 428/413
[58] Field of Search .................... 310/215, 43, 45; 174/138 E; 428/413; 29/605, 606

[56] References Cited

U.S. PATENT DOCUMENTS

| | | | |
|---|---|---|---|
| 2,992,954 | 7/1961 | Nelson et al. | 428/413 |
| 3,388,458 | 6/1968 | Logan | 29/606 |
| 3,563,850 | 2/1971 | Stackhouse et al. | 428/413 |
| 3,735,169 | 5/1973 | Balke et al. | 310/215 |
| 3,943,392 | 3/1976 | Keuper et al. | 310/215 |
| 3,960,803 | 6/1976 | Smith et al. | 428/413 |
| 3,974,314 | 8/1976 | Fuchs | 310/215 |
| 3,983,289 | 9/1976 | Mishizaki et al. | 428/413 |

*Primary Examiner*—William R. Dixon, Jr.
*Attorney, Agent, or Firm*—Schiller & Pandiscio

[57] ABSTRACT

Windings for electrical machines and appliances, which windings remain mechanically stable even when the operational temperature is exceeded for a short period and ensure good heat transfer between the winding and the iron of the magnet core without additional impregnation, are produced by lining the slots in the magnet core with a slot liner coated on at least the side facing the magnet core with at least one B-state resin which is completely non-tacky at room temperature but is capable of being cured and becomes tacky at the temperatures employed in the curing of the thermosetting adhesive layer of the adhesive varnished wire used, by making the winding from adhesive varnished wire with a thermosetting adhesive layer and curing by heating the coating on the slot liner and the adhesive layer on the adhesive varnished wire.

22 Claims, No Drawings

METHOD OF PRODUCING WINDINGS FOR ELECTRICAL MACHINES AND APPLIANCES

The present invention concerns a method of producing windings for electrical machines and appliances, which windings remain mechanically stable even when the operational temperature is exceeded for a short period and ensure good heat transfer between the winding and the iron of the magnet core.

In small electric motors such as those in vacuum cleaners, food mixers and hand tools for instance — i.e. electric motors of less than about 1 metric HP — the windings are nowadays produced using enamelled wire (i.e. wire having an insulating layer). So that the wire is not cut by the armature stampings, the slots in the stampings are lined with a so-called slot liner (slot insulation) before the wire is wound on. Once wound on, the winding is impregnated with an impregnating varnish to improve the mechanical strength of the winding, to protect the wire from outside influences such as dust, moisture and chemicals present in the atmosphere and to bond the slot liner both to the iron of the armature stamping and to the winding. This varnish also fills any air gaps present, thus enhancing the dissipation of heat from the winding into the iron of the armature stampings. The impregnating varnish must of course be compatible with the enamel used to insulate the wire.

For about 20 years adhesive varnished wire has been commercially available in which a normal insulating layer is covered with an adhesive layer which serves to bond the turns of wire together. The use of adhesive varnished wire renders the above-mentioned additional impregnation with an impregnating varnish unnecessary. Until very recently practically the only materials used for the adhesive layer were thermoplastic synthetic resins.

Of late, adhesive varnished wire with a thermosetting adhesive layer has become part of the prior art (see German Offenlegungsschrift No. 2,443,252 and Belgian Pat. No. 819,919). The adhesive layer is in a storage-stable B-state (i.e. partly cross-linked). If, though, a winding made up of such wire is heated for a certain length of time (e.g. 2 to 3 hours) at a temperature of 170° C for instance, then the adhesive layer melts. Since, as is well known, the wire is wound on under a certain tension the melting adhesive layer is forced at the points of contact of the turns of wire into the cavities between the wire and up against the slot liner. At the same time the adhesive layer is cured by heating. The winding is thus mechanically stabilized and adheres to most of the materials used as the slot liner. The slot liner is not however bonded to the iron of the magnet core with the result that heat transfer between the slot liner and the iron is poor. Depending on the type and purpose of the winding, the contents of the slot (slot liner + wire) can even become displaced in operation relative to the bottom of the slot. Although these problems have been outlined using windings for small electric motors as an example, analogous problems also occur in windings for transformers, magnetic valves etc. If no subsequent impregnation with solvent-containing or solvent-free varnishes is undertaken the above problems cannot be solved by conventional means.

It has however been found that the difficulties outlined above do not occur if slot liner is used which is coated on one or preferably both sides with B-state resins which are completely non-tacky at room temperature but are capable of being cured and become tacky at the temperatures employed in the curing of the adhesive layer of the adhesive varnished wire. The thermosetting thus provides the necessary bonding between the slot liner and the iron of the magnet core. It is also convenient for the coated slot liner to have a smooth surface so that in a series production process it can be introduced into the slots by machine without difficulty.

The temperatures to which a material can be exposed are indicated by the various classes defined in IEC publication No. 85 issued in 1957 by the Commission Electrotechnique Internationale (CEI or IEC) and entitled "Recommandations relatives a la classification des matieres destinees a l'isolement des machines et appareils electriques en fonction de leur stabilite en service". IEC class B means the maximum temperature is 130° C, class F 155° C and class H 180° C.

Sheets 25 μm (microns) to 0.5 mm thick may be used as the slot liner. For IEC class B, suitable materials are for instance polyester sheets or laminates such as polyester sheet/laminated fiber sheet, polyester sheet/laminated fiber sheet/polyester sheet or laminated fiber sheet/polyester sheet/laminated fiber sheet. (As is well known laminated fiber sheet is made from very pure cellulose by filtration using a cylindrical suction filter and compressing to give a very dense paper). For IEC classes F and H, paper made from polyamide fibres or even asbestos paper may be used, optionally in combination with other materials. In principle any slot liner can be used which is suited to the anticipated operating temperature and is not attached by the varnishes employed.

Various varnishes, depending on the anticipated operating temperature, can be used to coat the slot liner; these varnishes are solutions of B-state resins which are completely non-tacky at room temperature but are capable of being cured and become tacky at the temperatures employed in the curing of the adhesive layer of the adhesive varnished wire, which resins may optionally be mixed with small amounts of suitable rubbers to improve the toughness, in a volatile solvent or solvent mixture, e.g. with a boiling point of about 100° C.

For IEC class B the following resins are suited for use as the B-state resin:
single stage phenolic resins,
epoxy resins — e.g. bisphenol resins — in combination with latent curing agents such as $BF_3$.

These resins should preferably be soluble in ketones such as acetone. They may be employed together with suitable ketone-soluble rubbers such as butadiene/acrylonitrile copolymers as the solution in a common volatile solvent such as a ketone — e.g. acetone — a mixture of a ketone and a hydrocarbon — e.g. toluene — or a higher molecular weight ester. The viscosity of the solution can be adjusted to a value suitable for use. This value will depend on the apparatus used. For roller coating a viscosity of about 50 cp for instance is suitable.

For IEC classes F and H the varnishes described in German Offenlegungsschrift No. 2,443,252 and Belgian Pat. No. 819,919 (which are included by way of reference) are suitable. No phenolic solvents are used however, lower boiling solvents such as methyl glycol acetate (2-methoxyethyl acetate), optionally mixed with ketones, being used instead. In principle, any varnish of this kind may be employed which is compatible with the insulating layer of the adhesive varnished wire with a thermosetting adhesive layer.

The above-mentioned German Offenlegungsschrift and Belgian patent disclose varnishes containing a. a polyurethane ester imide having terminal isocyanate groups blocked by a monohydric phenol and having free hydroxy groups, such as the product obtained by condensing a monohydric phenol, a polyester imide containing hydroxy groups and a polyisocyanate, and b. a substantially linear epoxy resin containing secondary hydroxy groups and having a molecular weight greater than 30,000.

As the polyester imide a condensation product of trimellitic acid anhydride, glycine, triethylene glycol and tris-(2-hydroxyethyl)-isocyanurate is preferred which contains the dicarboxylic acid of the formula:

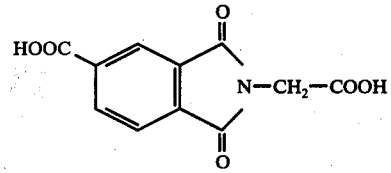
I the triethylene glycol of the formula:

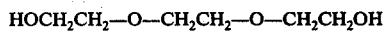
II and the tris-(2-hydroxyethyl)-isocyanurate of the formula:

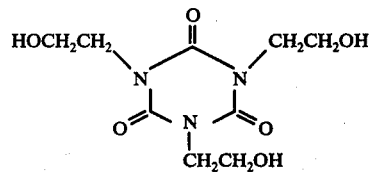
III in the molar ratio
I: (II+III) = 1:1.2 to 1:2
II: III = 1:1 to 10:1.

As the polyisocyanates, compounds of the formula:

or mixtures of these are preferred, the ratio of hydroxy groups in the polyester imide to isocyanate groups preferably being 1:1 to 1:1.5.

Phenol, cresol or the xylenols are preferred as the monohydric phenols.

As epoxy resins, those with an average molecular weight of 30,000 to 200,000 are preferred, in particular high molecular condensation products of epichlorohydrin and bisphenol A of the formula:

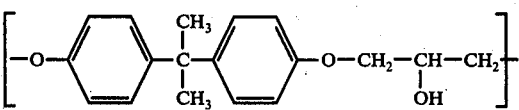

Suitable, commercially available products are e.g. Epikote 52-L-32 (molecular weight approx. 80,000) and Epikote 55-L-32 (molecular weight approx. 200,000) made by Shell and having a hydroxy number of about 0.35 — i.e. containing about 0.35 equivalents of hydroxy groups per gram of product. The epoxy equivalent cannot be determined practically, owing to the low epoxy group content in these products.

The weight ratio of polyurethane ester imide to epoxy resin may be e.g. up to 20:80.

EXAMPLE 1

A slot liner in roll form 0.15 to 0.20 mm thick (polyester sheet or a laminate such as polyester sheet/-laminated fiber sheet, polyester sheet/laminated fiber sheet/polyester sheet or laminated fiber sheet/polyester sheet/laminated fiber sheet) is coated, in a varnishing apparatus which allows the slot liner to be dipped and the amount of varnish to be regulated, with a solution of 40 to 20, preferably 30, parts by wt. of an acetone-soluble butadiene/acrylonitrile copolymer and 60 to 80, preferably 70, parts by wt. of an acetone-soluble phenolic resin with a melting point of about 70° C in an

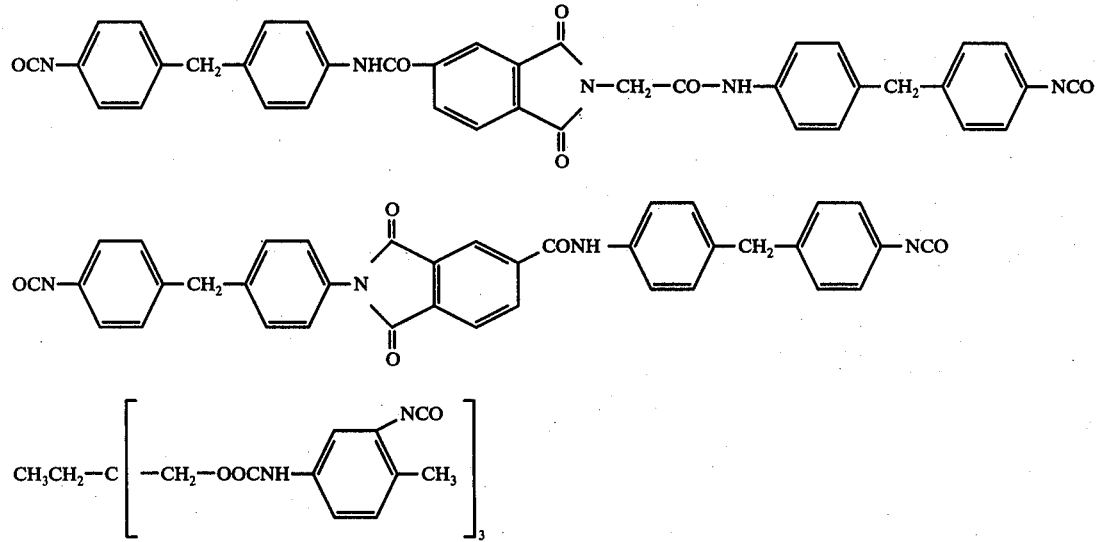

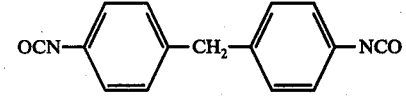

amount of acetone which gives a viscosity suitable for the varnishing apparatus used.

The slot liner, which is varnished on both sides, is dried in a ventilated drying oven, the resins being cured to such an extent that the varnish layer is dry on cooling and no longer tacky but is not yet too brittle. The coated slot liner can be rolled up and is suitable for IEC class B.

Suitable drying and curing conditions can be determined by testing the treated slot liner (see e.g. DIN 53281 for details of the preparation of test specimens and DIN 53283 for details of tensile test).

EXAMPLE 2

A polyamide fibre paper such as Nomex ® made by E. I. Du Pont and Nemours is coated as described in Example 1 with a varnish described in Example 1, 2, 3 or 4 of German Offenlegungsschrift No. 2,443,252. The phenol used as solvent in this varnish is however replaced by a lower boiling solvent such as methyl glycol acetate (2-methoxyethyl acetate), optionally mixed with a volatile ketone such as acetone or methyl ethyl ketone. Conveniently, a solvent or solvent mixture with a boiling point of approx. 100° C is used. The slot liner coated in this way is suitable for IEC classes F and H.

The same varnishes can be also applied to polyester sheet and laminated fiber sheet laminates of the kind described in Example 1, slot liners suitable for IEC class B being obtained.

With the slot liners of Examples 1 and 2 and using adhesive varnished wire having a thermosetting adhesive layer, windings for electric motors and appliances can be produced using conventional methods. If slot liners coated on one side are used the coated side must face the magnet core. While heating the winding in an oven to bond it (e.g. at 170° C) the side of the slot liner facing the magnet core is then permanently bonded to the iron of the magnet core. Thus not only is the winding bonded but heat transfer between the winding and the iron of the magnet core is improved without an additional impregnation being necessary.

We claim:

1. A method of forming windings on magnetizable cores for small electrical machines, wherein said cores have a plurality of openings for receiving said windings, said method comprising the steps in sequence of:
   (a) lining said openings with a slot liner formed of a material selected from the group consisting polyester sheet, laminates of polyester sheet and laminated fiber sheet, paper made from polyamide fibers, and asbestos paper, said slot liner being coated on at least the side facing the magnetizable core with at least one B-state resin which (i) is completely non-tacky at room temperature but (ii) is capable of being cured and of becoming tacky at elevated temperatures,
   (b) randomly winding said core with a thermosetting adhesive varnished wire, and
   (c) heating said wound core so as substantially simultaneously to cure said coating on said slot liner and said adhesive on said wire and to bond said liner to said core and said wire to said liner.

2. The method of claim 1, wherein said slot liner is coated on at least one side with a ketone-soluble resin which has a melting point of about 70° C, selected from the group consisting of a B-state epoxy resin and a phenolic resin.

3. The method of claim 2, wherein said resin comprises 40 to 20% by wt. rubber and 60 to 80% by wt. phenolic resin.

4. The method of claim 2 and further comprising a ketone-soluble rubber mixed with said resin.

5. The method of claim 4 wherein said ketone-soluble rubber comprises a butadiene/acrylonitrile copolymer.

6. The method of claim 4 wherein said resin is mixed with rubber in a ratio of 70:30.

7. The method of claim 1, wherein said slot liner is coated on at least one side with a polyurethane ester imide having (i) terminal isocyanate groups blocked by a monohydric phenol and (ii) free hydroxy groups, said imide being the condensation reaction product of (iii) a monohydric phenol, (iv) a polyester imide containing hydroxyl groups and (v) polyisocyanate, and (vi) a substantially linear epoxy resin containing secondary hydroxy groups and having a molecular weight greater than 30,000.

8. The method of claim 7, wherein said monohydric phenol is selected from the group consisting of phenol, cresol and xylenol, and said polyester imide comprises the N-carboxy-methylimide of trimellitic acid (I), triethylene glycol (II) and tris-(2-hydroexyethyl)-isocyanurate (III).

9. The method of claim 8, wherein components I, II and III are present in said condensation reaction product in the molar ratio
I: (II + III) = 1:1.2 to 1:2
II: III = 1:1 to 10:1

10. The method of claim 8, wherein said epoxy resin comprises a condensation product of epichlorohydrin and bisphenol A and has an average molecular weight in the range of 30,000 to 200,000.

11. The method of claim 10, wherein said epoxy resin has a hydroxy number of about 0.35.

12. A wound core for a small electrical machine and comprising in combination:
   a magnetizable core having a plurality of slots formed thereon,
   thermosetting adhesive varnish coated wires randomly wound in said slots, and
   a laminate of polyester sheet and fiber sheet lining said slots between said core and said wires, said laminate being coated with a B-state resin which (i) is non-tacky at room temperature but (ii) is capable of being cured and of becoming tacky at the thermosetting temperature of the adhesive varnish on said wire.

13. A wound core according to claim 11 wherein said coating comprises a ketone-soluble resin which melts at a temperature of about 70° C, said resin being selected from the group consisting of B-state epoxy resin and a phenolic resin.

14. A wound core according to claim 13 and further comprising a ketone-soluble rubber mixed with said resin.

15. A wound core according to claim 14 wherein said ketone-soluble rubber comprises a butadiene/acrylonitrile copolymer.

16. A wound core according to claim 14 wherein said coating comprises about 30% by weight rubber and about 70% by weight phenolic resin.

17. A wound core according to claim 12 wherein said coating comprises 40 to 20% by wt. rubber and 60 to 80% by wt. phenolic resin.

18. A wound core according to claim 12 wherein said laminate is coated on at least one side with a polyurethane ester imide having (i) terminal isocyanate groups blocked by a monohydric phenol and (ii) free hydroxy groups, said imide being the condensation reaction product of (iii) a monohydric phenol, (iv) a polyester imide containing hydroxyl groups and (v) polyisocyanate, and (vi) a substantially linear epoxy resin containing secondary hydroxy groups and having a molecular weight greater than 30,000.

19. A wound core according to claim 18 wherein said monohydric phenol is selected from the group consisting of phenol, cresol and xylenol, and said polyester imide comprises the N-carboxy-methylimide of trimellitic acid (I), triethylene glycol (II) and tris-(2-hydroxyethyl)-isocyanurate (III).

20. A wound core according to claim 19 wherein components I, II and III are present in said condensation reaction product in the molar ratio
I: (II + III) = 1:1.2 to 1:2
II: III = 1:1 to 10:1

21. A wound core according to claim 19 wherein said epoxy resin comprises a condensation product of epichlorohydrin and bisphenol A and has an average molecular weight in the range of 30,000 to 200,000.

22. A wound core according to claim 21 wherein said epoxy resin has a hydroxy number of about 0.35.

UNITED STATES PATENT OFFICE
CERTIFICATE OF CORRECTION

PATENT NO. : 4087712
DATED : May 2, 1978
INVENTOR(S) : Hans Mosimann, Werner Marti It is certified that error appears in the above-identified patent and that said Letters Patent are hereby corrected as shown below:

Claim 8, column 6, lines 24-25, the chemical entity "tris-(2-hydroexyethyl)-isocyanurate" should read --tris-(2-hydroxyethyl)-isocyanurate--.

Signed and Sealed this

Twenty-sixth Day of September 1978

[SEAL]

Attest:

RUTH C. MASON
Attesting Officer

DONALD W. BANNER
Commissioner of Patents and Trademarks